US006282524B1

(12) United States Patent
Kramer

(10) Patent No.: US 6,282,524 B1
(45) Date of Patent: Aug. 28, 2001

(54) METHOD AND SYSTEM OF PRINTING POSTAGE INDICIA FROM AN ENVELOPE DESIGN APPLICATION

(75) Inventor: Allen L. Kramer, Middletown, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/119,464

(22) Filed: Jul. 20, 1998

(51) Int. Cl.[7] .......................... G06F 17/00

(52) U.S. Cl. .......................... 705/408

(58) Field of Search .......................... 705/401, 402, 705/408, 410, 411, 60, 62; 101/71; 283/71; 235/101, 375; 380/51; 713/1; 345/439

(56) References Cited

U.S. PATENT DOCUMENTS

| | | | | |
|---|---|---|---|---|
| 5,606,609 | | 2/1997 | Houser et al. | 713/179 |
| 5,652,884 | * | 7/1997 | Palevich | 713/1 |
| 5,682,468 | | 10/1997 | Fortenbery et al. | 345/419 |
| 5,689,703 | | 11/1997 | Atkinson et al. | 707/103 |
| 5,696,914 | | 12/1997 | Nahaboo et al. | 345/333 |
| 5,717,597 | * | 2/1998 | Kara | 705/408 |
| 5,719,776 | | 2/1998 | Haug | 705/411 |

FOREIGN PATENT DOCUMENTS

| | | | |
|---|---|---|---|
| 9219115U1 | | 5/1992 | (DE) . |
| 0496575A2 | | 1/1992 | (EP) . |
| 0603095A2 | | 10/1993 | (EP) . |
| 0780803A2 | | 6/1997 | (EP) . |
| WO 97/14117 | * | 4/1997 | (WO) . |

OTHER PUBLICATIONS no author, "Escher Group Anounces Universal Postal Client—Product to Replace Postage Meter Hardware with Internet Software Solution"; Oct. 1997; PR Newswire, p1006NEM049; DialogWeb copy pp. 1–3.*

* cited by examiner

*Primary Examiner*—James P. Trammell
*Assistant Examiner*—Thomas A. Dixon
(74) *Attorney, Agent, or Firm*—Brian A. Lemm; Michael E. Melton

(57) ABSTRACT

The invention is a method and system for printing a postage meter indicia from a data processing system. The printing of the indicia is under control of an indicia control in an object linking and embedding (OLE2) environment. The method begins with instantiating an indicia control in the design application that will utilize the object control for indicia printing. The indicia control is attached to an application window for use by the application. Once established, the control will be passed a set of postage meter data from an interoperatively linked postage meter. The interface is enhanced by displaying an envelope representation on a monitor screen to a system operator, wherein the envelope display comprises design fields and wherein one of the design fields is a representation of the postage indicia. The postage indicia additionally comprises postage meter data such as available funds, a transaction value, and a postage meter identification. Additional parameters which may be set by transferring data from linked routines include: a date; a zip code; and a postage value. The envelope design fields comprise: a return address field; a destination address field; and, optionally, a Postnet barcode and/or an advertising slogan. The method then continues with the printing of the postage indicia to the application file and subsequently to an envelope. Printing to the application, as opposed to an indicia file, causes decrementing of the funds available to the data processing system by an amount equal to the postage value in the printed indicia.

5 Claims, 8 Drawing Sheets

METHOD AND SYSTEM OF PRINTING POSTAGE INDICIA FROM AN ENVELOPE DESIGN APPLICATION

RELATED APPLICATIONS

Reference is made to application Ser. No. 09/119,183, entitled A METHOD AND SYSTEM OF PRINT STREAM ADDRESS EXTRACTION, assigned to the assignee of this application and filed on even date herewith.

Reference is made to application Ser. No. 09/119,463, entitled A METHOD AND SYSTEM OF DISPLAYING DATABASE CONTENTS IN ENVELOPE DATA FIELDS, assigned to the assignee of this application and filed on even date herewith.

Reference is made to application Ser. No. 09/119,462, entitled A METHOD AND SYSTEM FOR CAPTURING DESTINATION ADDRESSES FROM LABEL DATA, assigned to the assignee of this application and filed on even date herewith.

BACKGROUND OF THE INVENTION

Graphics and design programs which allow a system user to create representations that can in turn be modified before printing are especially useful in creating finished documents. One such program is the Envelope Designer™ Plus graphics program from Pitney Bowes Inc. of Stamford, Conn. This program allows the user to create envelope and label designs that can be tailored to specific needs.

An envelope typically has two major design elements; these are the destination address block and the return address block. To these major elements, there can be added: a Postnet barcode; one or more message lines; and, one or more graphic images. The Envelope Designer™ Plus graphics program allows the system user to create the address, return address, attention line and message blocks, assign text attributes and position the blocks within a selected layout. The system user can also specify whether or not to include an optional Postnet™ bar code (Postnet is a trademark of the United States Postal Service). and its corresponding location on the envelope or label. The graphics program also allows the system operator to place a non-printing overlay on the envelope to ensure that the design and placement conforms to postal guidelines. The program can be further linked with the SmartMailer™ program from Pitney Bowes Inc. to attach address fields to the print field of the envelope or label. The resulting layout brings efficiency and cost benefit to the production of an envelope face; efficiency from the use of existing data and graphics files, and cost savings from the possible postal automation discounts that attach to certain categories of batch mailing and correctly zip-coded business mail.

The ability of an envelope/label designer program to be flexible, while giving its users the ability to link with databases that provide address files, is of great practical as well as commercial importance. The prior art has been limited in its ability to be flexible enough to be adapted to envelope/label design that can actually link with databases that are capable of being introduced to address hygiene routines.

As the capabilities of data processing systems has grown, so too have the requirements that are tasked to these systems. Greater speed in these systems has given rise to more detail-oriented applications, greater memory capability has made memory intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

One such means of promoting flexibility within a data processing system is the use of "object-oriented" design (OOD). Object oriented programming languages are useful in removing some of the restrictions that have hampered application design due to the inflexibility of traditional programming languages.

OOD utilizes a basic element or construct known as the"object," which combines both a data structure and an intended behavior characteristic within the single element. Objects are bundles of data and the procedures which best identify the use of that data. Objects can be specific or conceptual and are often used to represent models of real-world object groupings; this has the effect of helping software applications become an organized collection of discrete objects in which data is held or moved based on the intended behavior of an object which is inherently unique. Each object knows how to perform some activity.

The objects interact and communicate with each other via messages. A message is initiated by one object for the purpose of getting a second message to perform an act such as performing the steps of a method. Information parameters may be passed along with the message so that the receiving object will have guidelines for performing its action.

Software objects share two characteristics; they all have"state" and "behavior." State is the condition of the object expressed in variables (what it knows), while behavior is implemented by performance of a method (what it can do). Packaging the object's variables, together with its methods, is referred to as "encapsulation." Encapsulation is used to hide unimportant implementation details from other objects; and, this in turn provides two primary benefits to software developers. These benefits are: (1) modularity and (2) information hiding.

Modularity of objects means that the source code for an object can be written and maintained independently of the source code for other objects, thus allowing a certain autonomy of purpose for each individual object. Information hiding, on the other hand, is the ability to keep private certain of its data and methods without effecting the other objects which may depend upon it. Common dependencies among objects can maintain communication by utilizing a public interface for information sharing.

Objects interact and communicate with each other through the use of messages. Each message has three components that are necessary for a receiving object to be able to perform a desired method; these are: (1) the object to whom the message is addressed; (2) the name of the method that is to be performed; and (3) the method required parameters. Because these three components alone represent what is required for methods to be activated, it is not required that objects be located within the same process in order for communication to take place. Message use, therefore, is the supporting means for object interaction. But to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class. Object interaction can be further optimized by the use of class distinction. Classes are organizational blueprints that define the variables and methods which are common to all objects of a particular group. Values for each of the variables are assigned and allocated to memory when an instance from a class is created. Additionally, methods can only be performed when a class instance has been allocated to memory. Thus, the most distinct advantage of class use is the ability to reuse the classes and thus further create more objects. Classes, in turn, can be subdivided into subclasses which inherit the state of the underlying class. The further advantage being the ability to create specialized implementations of methods.

The constant growth and expansion of software systems and the hardware platforms that support them has led to the emergence of object oriented programming which reduces time and memory capacity requirements by taking advantage of certain redundancies by treating them as unique software objects.

The advantages of objects lie in the ability of objects to link performance characteristics. The linking of objects to applications is done through object linking and embedding techniques known by the acronym"OLE2." This greatly optimizes the using system's ability to find data and use it effectively. Systems that utilize formats whose structure and requirements repeat, would benefit greatly from object oriented techniques. And, if the system were to be able to define its principle data requirements in the form of objects, it would inherit the advantages of the object oriented environment while maintaining the inherent system advantages.

OOD is known in the software arts and specific discussion of application design based upon OOD is not required for a thorough understanding of the applicant's claimed invention. It is, however, one object of the present claimed invention to disclose a method and system for utilizing object oriented design to effectively and efficiently link applications within an envelope/label design system.

The mailing systems art can clearly benefit from a method that captures the data field of the postal indicia. Therefore, it is an object of the present invention to provide for a means of determining postal service and mailpiece revenue requirements; create objects derived therefrom; and, then utilize those objects to optimize mail piece production through an indicia control. And, it is a further object of the present disclosure to provide for a program that can link with object oriented design functionality to create an object that provides for an indicia control for proper preparation and accounting of postal payments for each envelope that receives a postal indicia imprinted thereupon.

SUMMARY OF THE INVENTION

The invention is a method and system for printing a postage meter indicia from a data processing system. The printing of the indicia is under control of an indicia control in an object linking and embedding (OLE) environment.

The invention method comprises a number of steps that begin with instantiating an indicia control in the design application that will utilize the object control for indicia printing. The indicia control is attached to an application window for use by the application. Once established, the control will be passed a set of postage meter data from a postage meter interoperatively linked to the data processing system. Use of the control is under the further control of a system operator whose interface to the application is from a display responsive to the application.

The interface is enhanced by displaying an envelope or a label representation on the monitor screen to the system operator, wherein the envelope display comprises design fields and wherein one of the design fields is a representation of the postage indicia. The postage indicia additionally comprises postage meter data such as available funds, a transaction value, and a postage meter identification. Additional parameters which may be set by transferring data from linked routines include: a date; a zip code; and a postage value.

The establishment of a print field, first for printing of the envelope fields and then for printing of the indicia, is an important step. The envelope design fields comprise: a return address field; a destination address field; and, optionally, a Postnet barcode and/or an advertising slogan.

Prior to printing, the displayed postage indicia is positionally responsive to instructions from the application for re-sizing the displayed envelope. The method then continues with the printing of the postage indicia to the application file and subsequently to a printable media such as an envelope. Printing to the application, as opposed to an indicia file, causes decrementing of the funds available to the data processing system by an amount equal to the postage value in the printed indicia. The printing of the indicia to the application acts as a blocking function against the printing of multiple indicias without the decrementing of funds. During printing, the envelope design fields are printed exclusive of the postage indicia field and then the postage indicia field is printed subsequent to the envelope design fields.

An important element of the subject method for utilizing the indicia control is the establishment of the indicia control as an object in an object oriented environment. The object further comprises: a programming interface; a human interface; and, a set of value instructions. The object additionally comprises action methods, the action methods further comprising printing instructions for instructing the data processing means to print said indicia. The set of value instructions further comprises: a set of postal value linking instructions; a set of display instructions; and, a set of default instructions.

The creation of the indicia printing object in an object oriented development environment of a data processing system comprises a number of steps. The steps begin with the establishment of an object creation function within the data processing system; then, registering a class within the object creation function and instantiating the class. The instantiation establishes a programming interface to the indicia printing object. The properties of the indicia printing object are then established by placing a set of object methods, printing functionality, data linking functionality, and a set of postage value tables within the indicia printing object by utilizing the programming interface.

The set of object methods comprises action instructions; the action instructions further comprising display instructions for instructing the data processing system to display data on the display means; storage instructions for instructing said data processing system to store data; and, printing instructions for instructing said data processing means to print data on said output means.

The postage value tables further comprise: a plurality of postal value data; rules for use of postal value data; error messages; and, suggestions for alternate paths of movement within said data processing system. Additionally, a human interface is established for allowing data to be displayed to a system operator under direction from the object methods;

and, then placing the human interface within the indicia printing object by utilizing the programming interface.

DETAILED DESCRIPTION OF THE PREFERRED EMBODIMENTS

Figure 1:
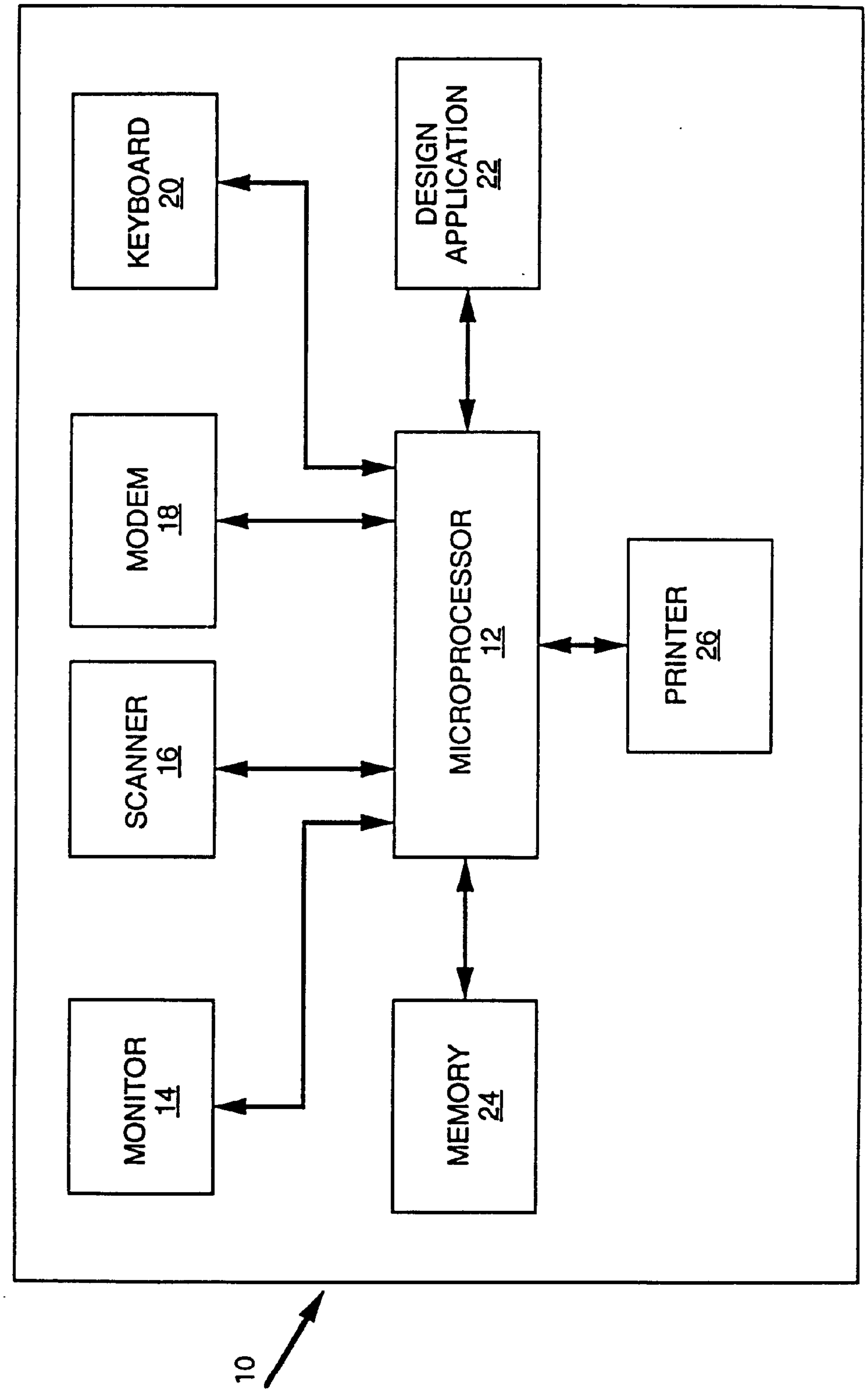
FIG. 1 is a block diagram of a system within which the method of the present invention could reside and be utilized.

Turning to FIG. 1, there is shown a block diagram of a system within which the method of the present invention could reside and be utilized.

System 10 comprises a microprocessor 12 interoperatively connected to monitor 14 for viewing the representation of the medium (such as an envelope or label) to be acted upon by the design application 22. The viewing of the media representation on monitor 14 promotes ease of use in selecting the various options available to the system user while formatting the medium, and provides an example of the human interface that can be brought to system 10. The monitor 14, under control of the design application 22, is able to show the system user: the medium representation; available menus from which option selections may be made; the medium's indicia; the amount of postage that will be incorporated into the indicia; and varied print fields available for printing to the selected medium. Microprocessor 12 is interoperatively connected to scanner 16. Scanner 16 provides system 10 with the ability to scan address field data, barcodes, or other scannable data sources as an input to design application 22. Printer 26 is also interoperatively connected to microprocessor 12 and serves as the output device by which the print fields are printed to the selected medium. Additionally, keyboard 20 is interoperatively connected to microprocessor 12 and serves as an input device for the input of data. Modem 18 gives system 10 the ability to communicate with other systems via communications means of varied types or to download print fields for remote storage; and, memory 24 allows the system to retain data for use in maintaining records or for storing data for future use.

Figure 2:
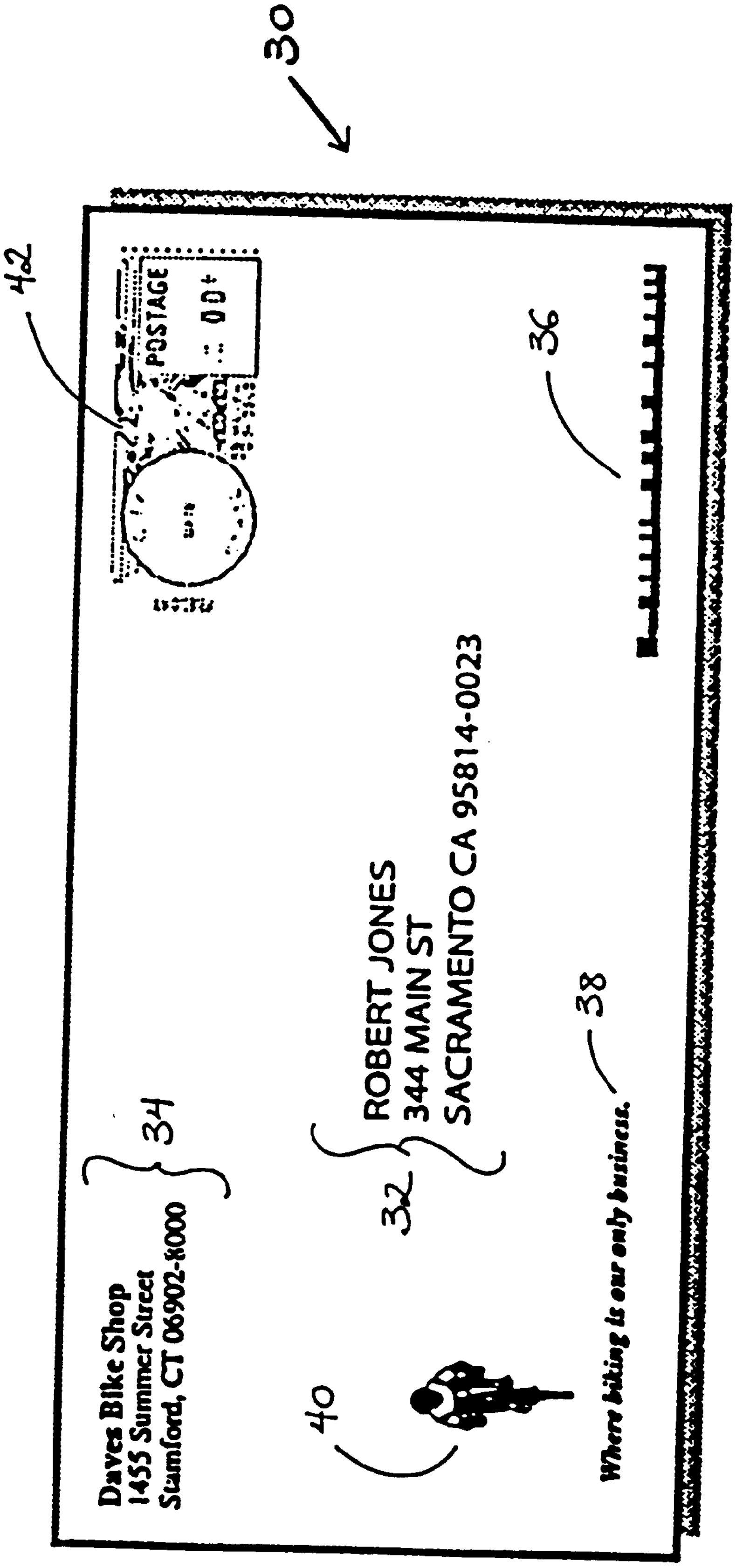
FIG. 2 is a drawing of the face of an envelope, and its component parts, which is representative of the medium that the subject invention is directed toward preparing.

Turning to FIG. 2 there is shown a drawing of the face of an envelope 30, and its component parts, which is representative of the medium that the subject invention is directed toward preparing.

Envelope 30 is shown comprising address block 32 which can be input by direct entry from the keyboard 20 or can be derived from access to a database introduced to the design application through the microprocessor 12 in connection with modem 18, or by accessing memory 24. The address indicated by the address block 32 can be subject to address hygiene routines prior to being saved within the print field represented by the face of envelope 30. Envelope 30 further comprises: return address block 34; Postnet barcode 36; single-line message 38; graphic image 40; and, indicia 42.

Figure 3:
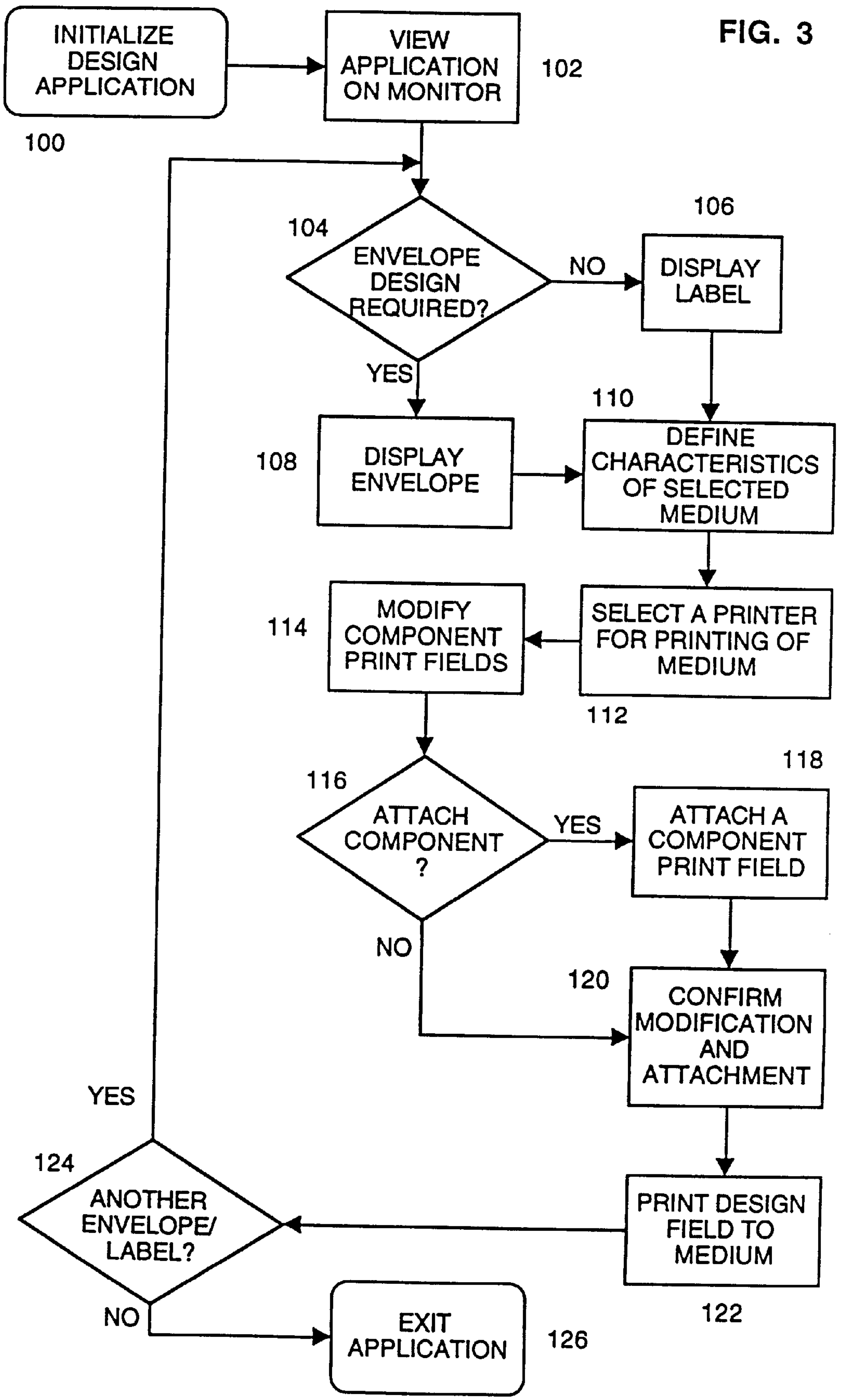
FIG. 3 is an upper level flowchart of the design application method within which the indicia control will be embedded for use.

Bearing in mind the environment suggested by FIGS. 1 and 2, we now turn to FIG. 3 where there is shown an upper level flowchart of the method of the present invention.

FIG. 3 begins with the initialization of the design application at step 100. From step 100, the method advances to step 102 where the first of the application's user screens is displayed to the system user on a monitor. The user screens will present menus, lists, and queries to the system user as the application routines are utilized; this will provide the step-by-step building of the medium print field for printing.

The system and method will guide the system user in the selection of a medium format beginning with the query at step 104. At step 104, the method queries as to whether or not an envelope design routine is required. If the response to the query is “”NO,” then the method displays a label routine for the system operator at step 106. Step 106 advances to step 110 where the characteristics of the selected medium are defined. If the response to the query at step 104 is “YES,” however, then the method displays an envelope routine for the system operator at step 108. Step 108 advances to step 110 where the characteristics of the selected medium are defined.

The method advances from step 110 to step 112 where the selection of a printer type is made. Printer characteristics may limit the characteristics available for designing the envelope or label media. The face of the envelope or label to be designed through the application is the print field for that medium. The print field is in turn comprised of component print field that, taken together, form the print field. From step 112, the method advances to step 114 where the component print fields can be modified. After modification, the method queries, at step 116, as to whether or not a component such as graphics, Postnet barcodes, postal indicia, or single-line messages are to be attached at the request of the system operator. If the response to the query is “YES,” then the method advances to step 118 where the appropriate component is attached to the print field. From step 118, the method advances to step 120 where confirmation of the modification and attachment, if any, is made. If, however, the response to the query, at step 116, is “NO,” then the method advances directly to step 120.

The modification, together with any attachments, define the design field to be printed to the medium. From step 120, the method advances to step 122 where the design field is printed to the medium. The method then queries, at step 124, as to whether or not another envelope or label is to be prepared. If the response to the query is “YES,” then the method returns to enter the method flow at step 104. If the response to the query is “NO,” however, then the method concludes its flow and the application is exited at step 126.

Figure 4:
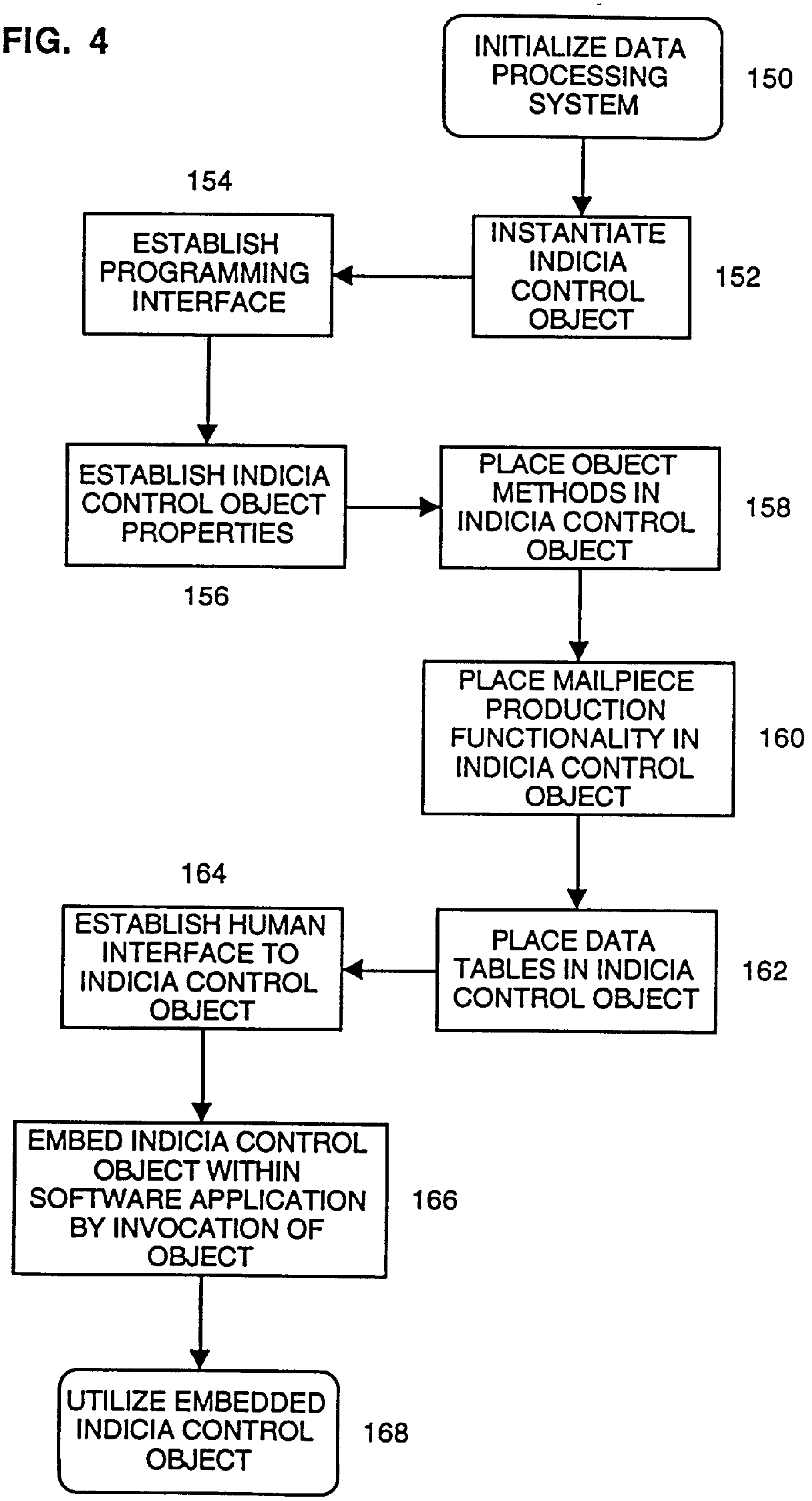
FIG. 4 is an upper level flowchart of the method of embedding the indicia control for use.

Turning to FIG. 4, there is shown a flowchart of the method utilized to create the indicia control object 300 which is further described with reference to FIG. 5B. A detailed discussion of object oriented programming is not required for a full understanding of the method described hereunder.

The creation of the indicia control object 300 begins at step 150 when a system user initializes a data processing system which has an object creation functionality resident therein. From step 150, the method advances to step 152 where the method instantiates an indicia control object by registering an object class with the object creation functionality. Registration of the class establishes, at step 154, a programming interface that will be used as a port of entry into the object. The port of entry will allow the system to place class properties within the object. The system user will determine the properties of the class at step 156. The specific properties of the indicia control object are discussed in the description of FIG. 5A.

From step 156, the method advances to step 158 where object methods are placed within the indicia control object by entering them through the programming interface. The method then advances to step 160 where mailpiece (envelope) production functionality is placed within the indicia control object 300 by entering it through the programming interface. In succession, indicia production data tables, and a human interface are placed within the indicia control object by entering them through the programming interface in steps 162 and 164 respectively. It should be noted that steps 160 through 164 can be performed in any order so long as each of the step actions are performed prior to utilization of the object.

When the properties of the indicia control object 300 have been placed into the object, the method advances to step 166 where the indicia control object is embedded or linked (OLE) where the indicia control object can be used for its intended purpose when invoked at step 168. The use of the indicia control object 300 reduces the steps necessary to apply mailpiece production functionality and is thus a significant improvement over the prior art. The properties of the indicia control object will now be discussed in detail with reference to FIGS. 5A and 5B.

Figure 5A:
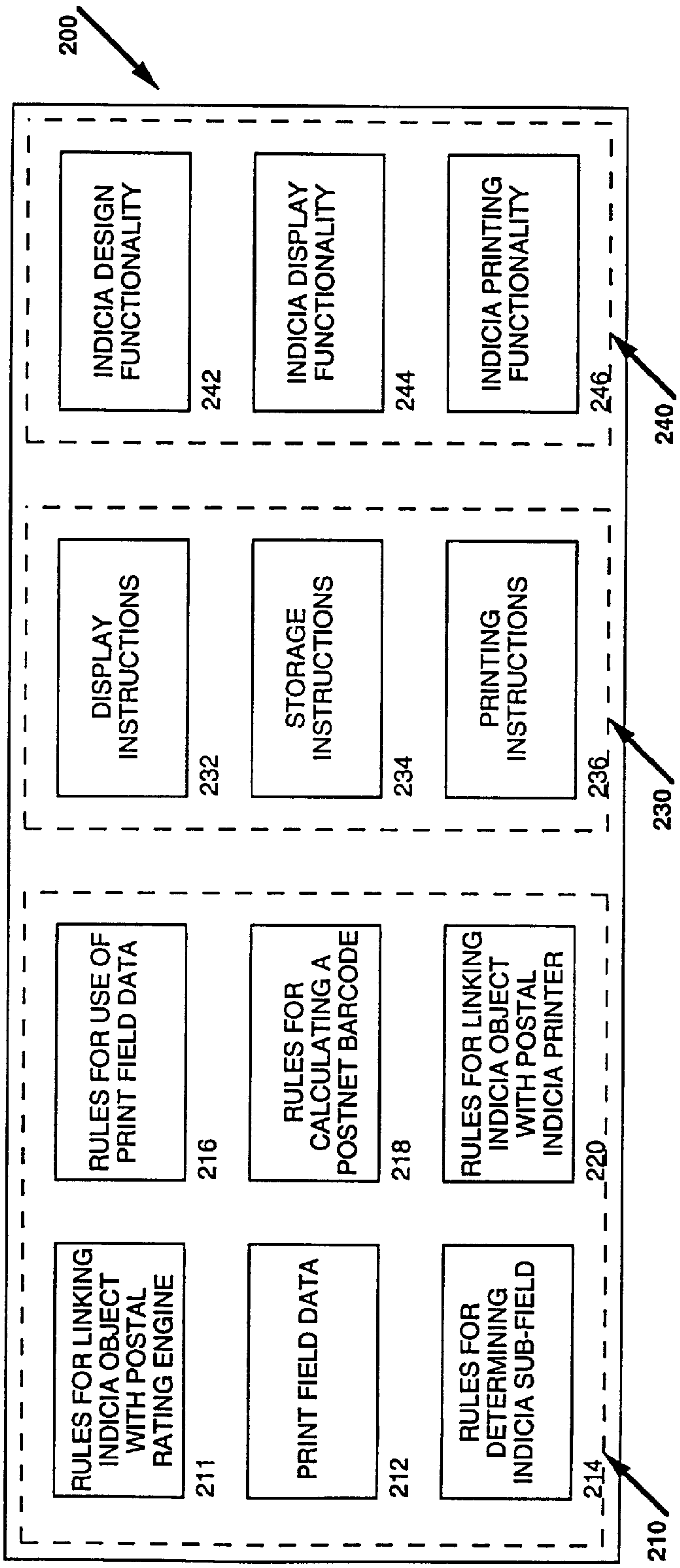
FIG. 5A is a block diagram of the indicia control object properties that are input to the object through a programming interface. The mailpiece object properties are divided into functional groupings.

Turning to FIG. 5A, there is shown a block diagram of the indicia control object properties 200 that are input to the object through a programming interface 302. The indicia control object properties 200 are divided into functional groupings 210, 230, and 240.

Functional grouping 210 comprises table data (hereinafter 210) that can be utilized by the object methods 230 or production functionality tools 240 within the indicia control object 300 or in its general environment. The data tables 210 further include: rules 211 for linking the indicia control object with postal rating engines of the type used to determine postage values so that a postal indicia can be printed; print field data 212; rules 214 for determining sub-fields; rules 216 for use of print field data; rules 218 for calculating a Postnet barcode; and, rules 220 for linking the indicia control object 300 with a postal indicia printer.

Functional grouping 230 comprises object methods (hereinafter 230) which include: display methods 306 for displaying the indicia characteristics to the system user; storage methods 308 for storing document layouts within an associated memory of system 10; and, printing methods 310 which cause human interface 314 to direct a printer, such as printer 26, to print data under the direction of the object.

Additional functionality for indicia control object 300 is provided by functional group 240. This functionality performs a unique role and includes: an envelope design functionality 242 which comprises a set of rules for indicia requirements with respect to placement of data on the face of the mailpiece; mailpiece display functionality 244 which displays the face of the mailpiece or envelope on a monitor 14 for ease of use and manipulation by a system user; and, mailpiece printing functionality 246 which includes those controls and interfaces for causing a printer 26 to produce a printed envelope. Each of the functionalities works together so that the printed envelope effectively embodies the mailpiece that was intended by the system user.

Figure 5B:
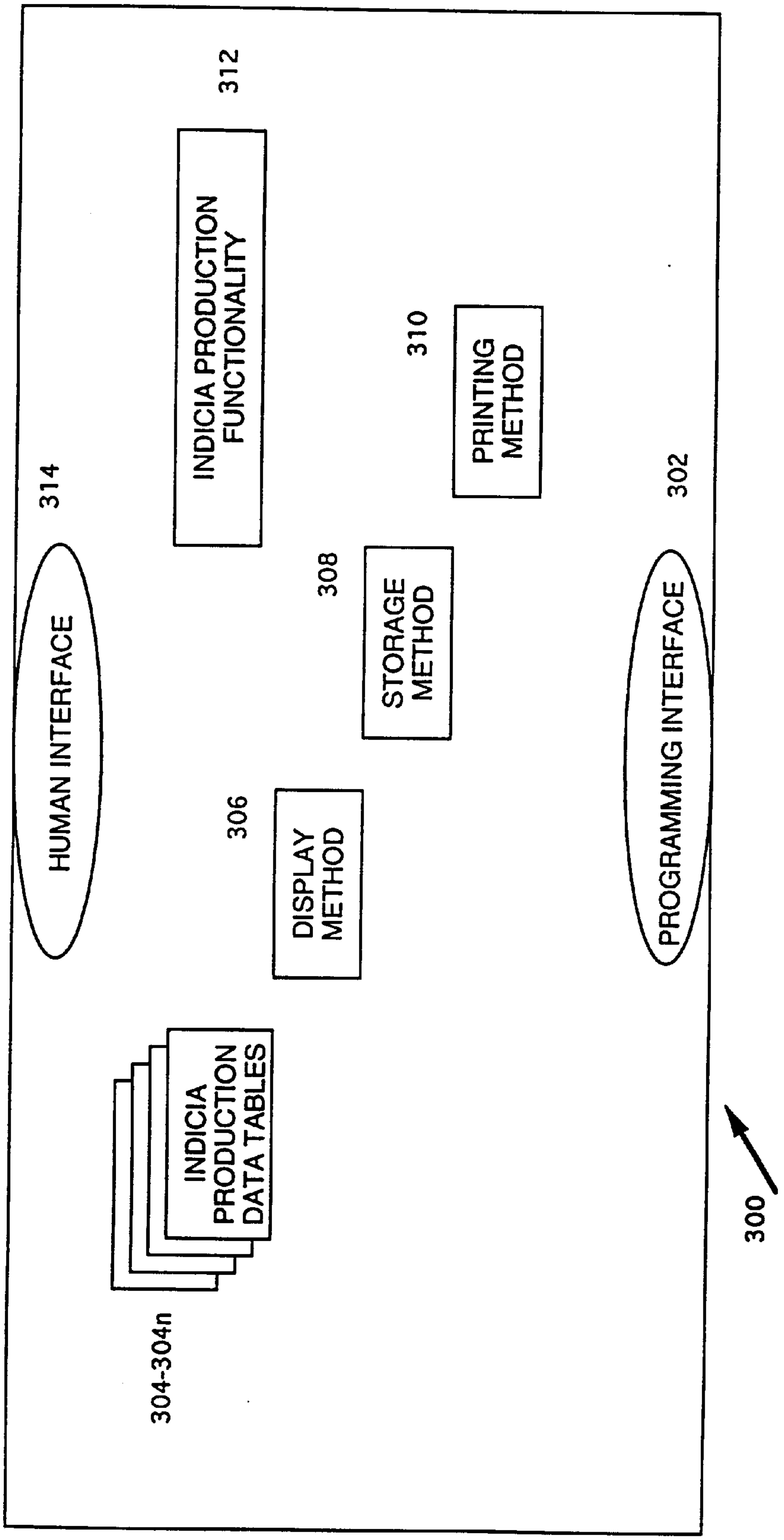
FIG. 5B is a block diagram of the indicia control object and its constituent sub-elements.

Turning to FIG. 5B, there is shown a block diagram of the indicia control object 300 and its constituent sub-elements.

The indicia control object 300 contains a programming interface 302 which serves as the portal by which properties of the indicia control object 300 can be entered into it. The programming interface 302 is returned by the data processing system when the indicia control object 300 is instantiated, thus allowing the indicia control object 300 to be invoked as needed.

In applications such as Visual Basic, an object oriented designer would use a command such as "createobject" to instantiate the object. The "createobject" command returns a programming interface such as "interface._" which will allow the designer to place the necessary properties into the object by entering their file name after the interface command.

The indicia control object 300 has specific requirements; therefore, through the programming interface 302 will come: a human interface 314; indicia production data tables 304–304*n*; indicia production functionality 312; and, a set of methods comprising display method 306, storage method 308, and printing method 310. Each of these elements is described in more detail hereinbelow.

Human interface 314 allows indicia control object 300 to provide a visual interface to the system user; additionally, printing methods 310 as contained in indicia control object 300 cause human interface 314 to direct a printer, such as printer 26, to print data under the direction of the object. Thus, the purpose of human interface 314 is to provide the path for user interface functionality.

Additional functionality for indicia control object 300 is provided by indicia production functionality 312. This functionality performs a unique role. Indicia production functionality 312 includes: a indicia design functionality 242 which comprises a set of rules for applying postal coding requirements with respect to placement of data on the face of the envelope; envelope display functionality which displays the face of the envelope, together with the indicia, on a monitor 14 for ease of use and manipulation by a system user; and, indicia printing functionality which includes those controls and interfaces for causing a printer 16 to produce a printed envelope with its associated indicia. Each of the functionalities works together so that the printed envelope effectively embodies the mailpiece that was intended by the system user.

Indicia production data tables 304–304*n* provide much of the production capability data utilized by the indicia control object 300. Indicia production data tables 204–204*n* include a number of fields from which an optimal data field will be constructed by indicia control object 300; these further include: print field data 212; rules 214 for determining indicia print field sub-fields; rules 216 for use of print field data; rules 218 for calculating a Postnet barcode; and, rules 222 for linking the indicia control object 300 with a postal indicia printer.

Paths of movement are further dictated by indicia control object 300 through the use of its distinct method elements. Display method 306 is used for instructing the data processing system 10 to display data on monitor 14. Storage method 308 is used for maintaining instructions for the data processing system 10 to store data in its associated memory or within a peripheral device. Printing method 310 is used for instructing the data processing system 10 to print data on output means such as printer 26.

Figure 6:
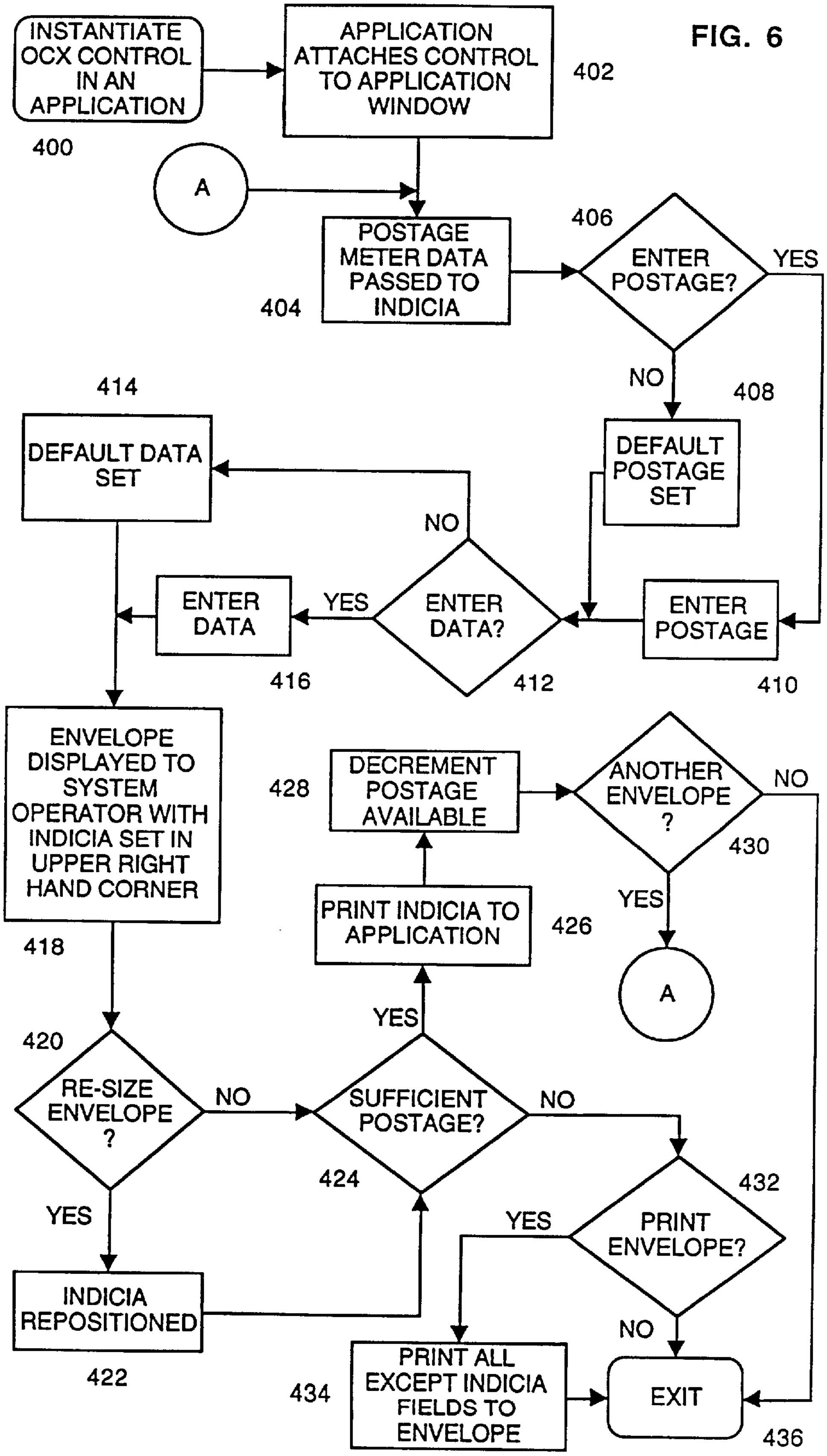
FIG. 6 is a detailed flowchart of the method of using the indicia control object within a design application.

Turning to FIG. 6, there is shown a flowchart of the use of the indicia control object within a particular application.

A preferred embodiment of the method flow begins at step 400 where the OCX control for the postal indicia is instantiated within an envelope design application. From step 400, the method advances to step 402 where the design application attaches control to a Windows routine within the application. The indicia control utilizes its programming interface to link with data being generated by a postage meter and the data is passed to the indicia control object at step 404.

The method advances from step 404 to step 406 where the method queries as to whether or not a postage value is to be entered into the indicia print field. If the response to the query is "YES," then the method enters the postage value at step 410 before inquiring at step 412 as to whether or not postage meter data is to be entered into the indicia field as well. Postage meter data includes an identification number, a zip code, and postage value determining data. If the response to the query at step 412 is "NO," then the method advances to step 414. If, however, the response to the query at step 412 is "YES," then the data is entered into the indicia fields at step 416 and the method then advances to step 418.

Returning to step 406, if the response to the query is "NO," then the default postage is set and placed into the indicia field at step 408. Step 408 then advances to step 412 where the method queries as to whether or not postage meter data is to be entered into the indicia field as well. If the response to the query at step 412 is "NO," then the method advances to step 414. If, however, the response to the query at step 412 is "YES," then the data is entered into the indicia fields at step 416 and the method then advances to step 418.

At step 418, a representation of the envelope with its associated print fields is displayed to the system operator. The representation will show the indicia located in the upper right hand of the envelope field. The method advances from step 418 to a query at step 420. Step 420 queries as to whether or not the system operator would like to re-size the envelope within the design application framework. If the response to the query is "YES," then the method repositions the indicia in accordance with the re-sized envelope field before advancing to a query at step 424. If the response to the query at step 420 is "NO," however, then the method advances directly to the query at step 424.

At step 424, the method queries as to whether or not sufficient postage value is available to the data processing system for this print transaction. If the response to the query is "NO," then the method advances to step 432 where the method queries as to whether the envelope should be printed anyway. If the response to the query is "YES," the envelope fields, less the indicia which has exercised its control function because of the insufficient postage, will be printed at step 434. From step 434, the method exits, at step 436, the application for this particular print transaction. If the response to the query at step 432 is "NO," then the method advances directly to the exit at step 436.

Returning to step 424, if the response to the query is "YES," then the method causes the indicia to print, at step 426, the indicia to the application print field which in turn causes the system to decrement the postage value of the transaction from available funds at step 428. The method advances from step 428 to a query at step 430.

The query at step 430 questions as to whether or not another envelope is to generated. If the response to the query is "YES, then the method advances along path A to re-enter the method flow at step 404. If the response to the query at step 430 is "NO," then the method advances directly to the exit at step 436.

Figure 7:
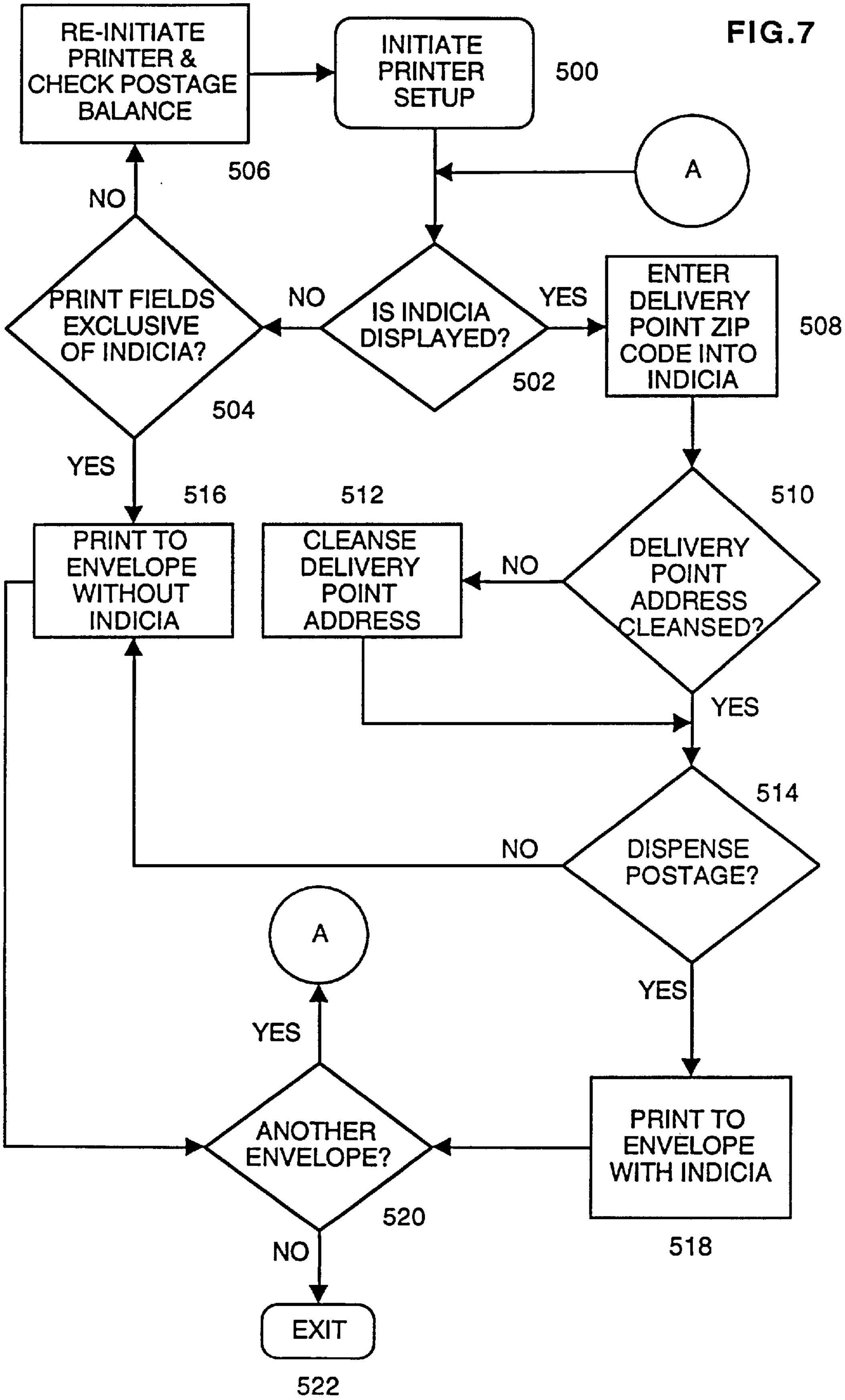
FIG. 7 is a detailed flowchart of the method of printing the indicia control within a design application.

Turning to FIG. 7, there is shown a flowchart of the print function utilization of the present indicia printing application.

The method begins at step 500 where the printer setup function is initiated. The method advances from step 500 to a query at step 502 which inquires as to whether the indicia is displayed to the system user on the system monitor. If the response to the query at step 502 is "NO," then the method advances to the query at step 504 where the system is prompted as to whether printing of the envelope print fields is required exclusive of the indicia. If the response to the query at step 504 is "NO," then the method advances to step 506 where the printer is re-initiated before the method returns to step 500. If continuous re-initiation of the printer is not desired, then the system user can terminate the flow by exiting at any time. If the response to the query at step 504 is "YES," however, then the method advances to step 516 where the envelope print fields are printed to the envelope without the associated indicia. The method advances from step 516 to step 520.

Returning to step 502, if the response to the query is"YES," then the method advances to step 508 where the delivery point zip code is entered into the indicia print field. The method then advances from step 508 to the query at step 510. At step 510, the method queries as to whether or not the delivery point address has been cleansed. Address correction and cleansing ensures more accurate delivery and may qualify the postage for automation discounts offered by the postal service and available to the indicia's linking control methods. If the response to the query is "NO," then the method advances to step 512 where address cleansing is performed before advancing to step 514. If the response to the query at step 510 is "YES," then the method advances directly to step 514.

Step 514 queries as to whether or not postage is to be dispensed for this transaction. If the response is to the query is "NO," then the method advances to step 516 where the envelope print fields are printed to the envelope without the associated indicia before advancing to step 520. However, if the response to the query is "YES," then the method advances to step 518 where the envelope print field, together with the indicia, is printed to the envelope. Prior to printing, the displayed postage indicia is positionally responsive to instructions from the application 22 for re-sizing the displayed envelope. The method then continues with the printing of the postage indicia 42 to the application file and subsequently to a printable media such as an envelope 30. Printing to the application 22, as opposed to an indicia file, causes decrementing of the funds available to the data processing system 10 by an amount equal to the postage value in the printed indicia 42. The printing of the indicia 42 to the application 22 acts as a blocking function against the printing of multiple indicias without the decrementing of funds. During printing, the envelope design fields are printed exclusive of the postage indicia field and then the postage indicia field is printed subsequent to the envelope design fields. From step 518, the method advances to step 520 which inquires as to whether or not another envelope is to be printed. If the response to the query is "YES," then the method returns along path A to re-enter the method at step 502; otherwise, if the response is "NO," then the method advances to step 522 and exits the application.

While certain embodiments have been described above in terms of the system within which the address object methods may reside, the invention is not limited to such a context. The system shown in FIG. 1 is an example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of creating an indicia printing object in an object oriented development environment of a data processing system comprising the steps of:

(a) establishing an object creation function within said data processing system;

(b) registering a class within said data object creation function and instantiating said class; and, wherein said instantiation establishes a programming interface to said indicia printing object;

(c) establishing the properties of said indicia printing object by:

(i) placing a set of object methods within said indicia printing object by utilizing said programming interface;

(ii) placing printing functionality within said indicia printing object by utilizing said programming interface;

(iii) placing data linking functionality within said indicia printing object by utilizing said programming interface;

(iv) placing a set of postage value tables within said indicia printing object by utilizing said programming interface; and (d) creating a human interface, for allowing data to be displayed to a system operator under direction from said object methods, and placing said human interface within said indicia printing object by utilizing said programming interface.

2. The method of claim 1, wherein said set of postage value tables further comprises:

(a) a plurality of postal value data;

(b) rules for use of postal value data;

(c) error messages; and (d) suggestions for alternate paths of movement within said data processing system.

3. The method of claim 1, wherein said set of object methods comprises action instructions; said action instructions further comprising display instructions for instructing said data processing system to display data on said display means.

4. The method of claim 1, wherein said set of object methods comprises action instructions; said action instructions further comprising storage instructions for instructing said data processing system to store data.

5. The method of claim 1, wherein said set of object methods comprises action instructions; said action instructions further comprising printing instructions for instructing said data processing means to print data on said output means.

* * * * *